J. J. KRALY.
AIRLESS TUBE FOR VEHICLE TIRES.
APPLICATION FILED FEB. 10, 1921.
1,396,852.
Patented Nov. 15, 1921.
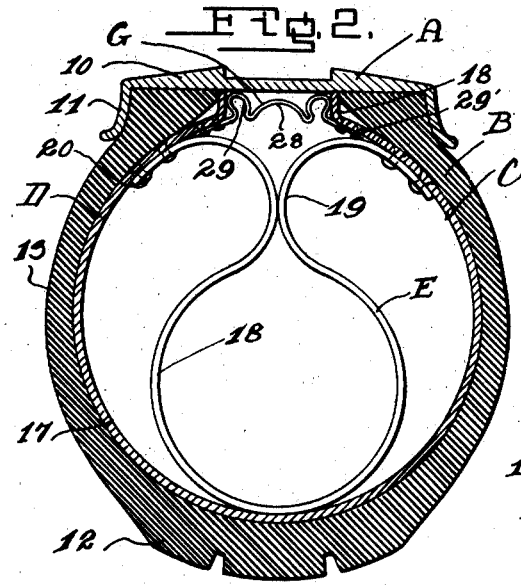
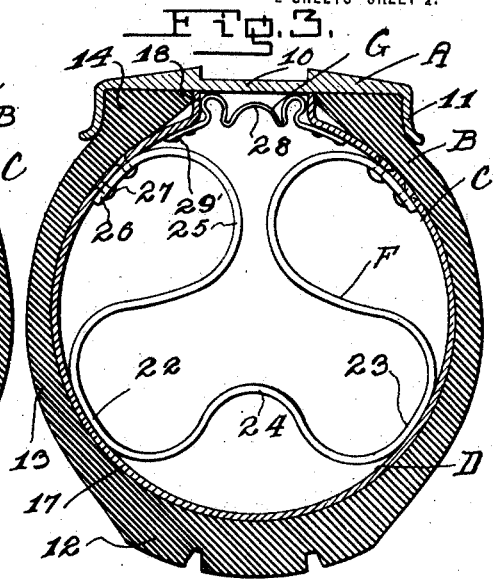
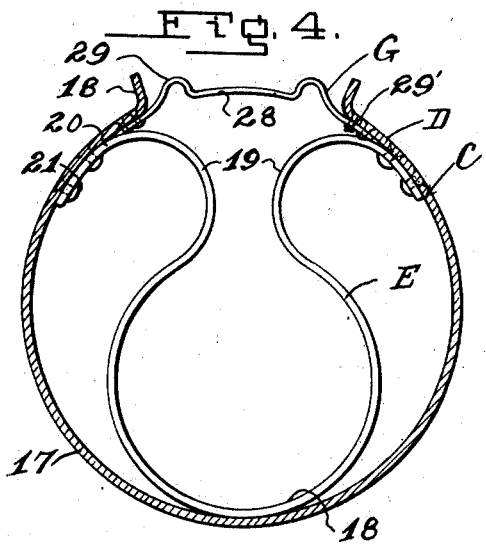
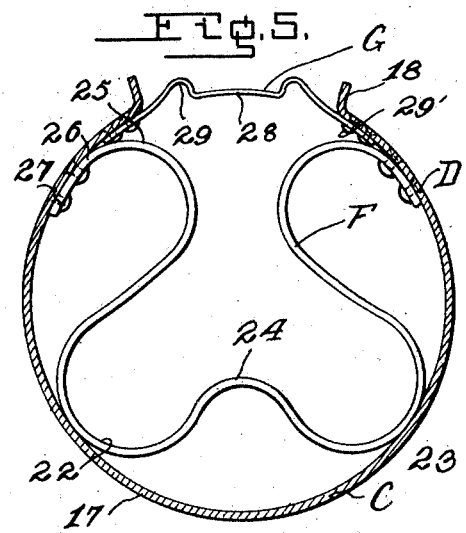
Joseph J. Kraly, Inventor

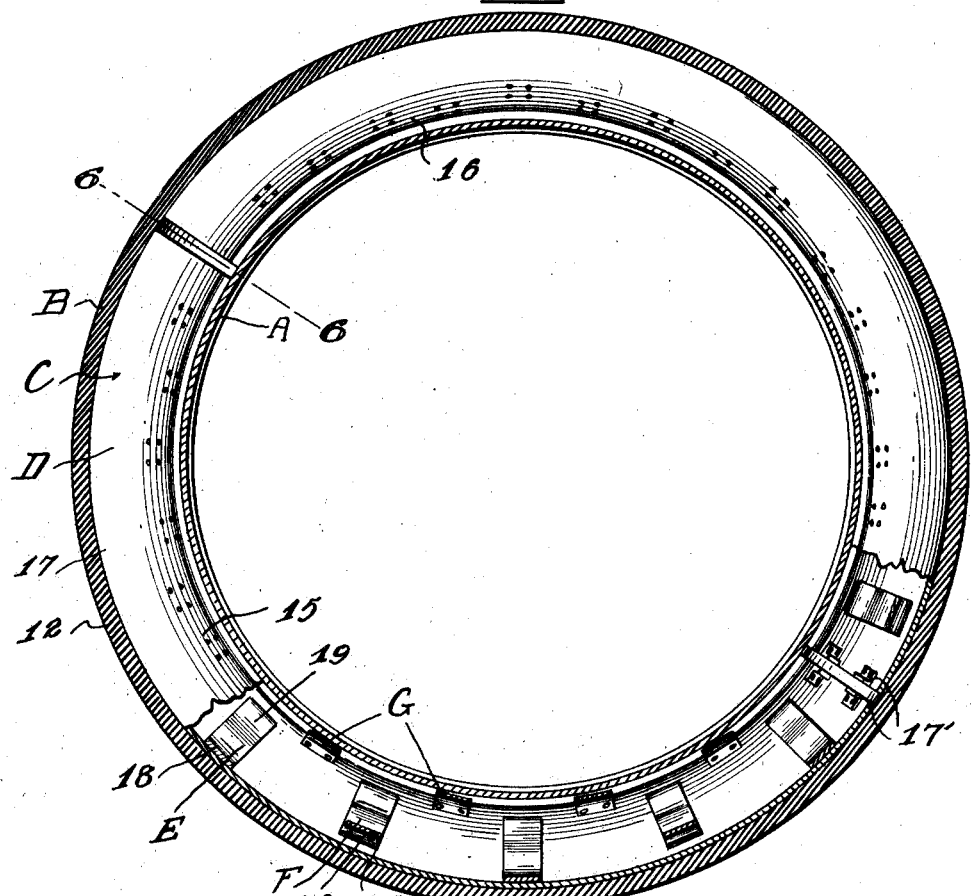
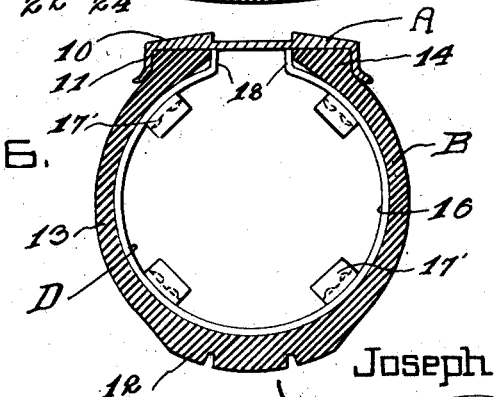

UNITED STATES PATENT OFFICE.

JOSEPH J. KRALY, OF CLEVELAND, OHIO.

AIRLESS TUBE FOR VEHICLE-TIRES.

1,396,852.  Specification of Letters Patent.  Patented Nov. 15, 1921.

Application filed February 10, 1921. Serial No. 443,869.

*To all whom it may concern:*

Be it known that I, JOSEPH J. KRALY, a citizen of the United States, residing at Cleveland, in the county of Cuyahoga and State of Ohio, have invented certain new and useful Improvements in Airless Tubes for Vehicle-Tires, of which the following is a specification.

This invention relates to tires for motor vehicles, and the primary object of the invention is to provide an improved spring device for use in connection with ordinary tire casings, for taking the place of the usual pneumatic inner tubes, so as to eliminate the difficulties contingent with the use thereof.

Another object of the invention is to provide a resilient core or inner tube for tire casings embodying a sectional annular transversely curved spring band shaped to conform to the configuration of the tire casing and novel types of leaf springs arranged in the band for absorbing shock, certain of the springs being arranged to absorb shock transmitted to the tread of the casing and others arranged to absorb shock transmitted to the casing at an angle to the tread thereof.

A further object of the invention is to provide a novel means for connecting the edges of the band together, so as to normally spread the inner edges of the band, and thereby create a tension against the beads of the tire casing, so as to effectively hold the same in position on the rim.

A further object of the invention is to provide a novel resilient core or inner tube for tire casings embodying a plurality of leaf springs arranged at various positions, so as to create a tension on the tire casing at all points thereof, so as to effectively absorb all shock transmitted thereto.

A still further object of the invention is to provide an improved spring inner tube for tire casings, of the above character, which will be durable and efficient in use, one that will be simple and easy to manufacture, and one which can be placed upon the market at a reasonable cost.

With these and other objects in view, the invention consists in the novel construction, arrangement and formation of parts, as will be hereinafter more specifically described, claimed and illustrated in the accompanying drawings forming a part of this specification, in which:

Figure 1 is a circumferential section through a tire casing showing the improved spring inner tube arranged therein, with parts of the tube broken away to illustrate the novel type of shock absorbing springs embodied therein.

Fig. 2 is a transverse section through the tire casing, rim and inner tube, showing one of the novel type of shock absorbing springs embodied in the inner tube.

Fig. 3 is a similar view showing another one of the novel type of shock absorbing springs arranged in the tube.

Fig. 4 is a cross sectional view through a portion of the improved inner tube illustrating the configuration thereof prior to the placing of a tube within the tire casing.

Fig. 5 is a similar view showing the other form of shock absorbing spring in the tube.

Fig. 6 is a cross sectional view through a tire casing and rim taken on the line 6—6 of Fig. 1, illustrating the means for preventing the telescoping of the sections of the inner tube.

Referring to the drawings in detail, wherein similar reference characters designate corresponding parts throughout the several views, the letter A indicates a rim; B a tire casing; and C the improved spring core or inner tube. The rim A may be of the usual or any preferred type and includes the annular body 10 and the side flanges 11.

The tire casing B is also of the usual or any preferred construction and includes the tread 12, the side walls 13 and the beads 14, which are adapted to engage the rim body 10 and the side flanges 11.

The improved spring core or inner tube C includes the resilient band D, the tread shock absorbing springs E; the side wall shock absorbing springs F and the connecting springs G for the inner edges of the spring band D.

The spring band D is preferably made from spring steel oil tempered, and includes a semi-circular section 15 and a semi-circular section 16. These sections 15 and 16 form an annular band and may be connected at one end, or connected at both ends, or left free at both ends. As shown in the drawings, the terminals of the semi-circular sections 15 and 16 are left free and are provided with inwardly extending bearing lugs 17' which are arranged at spaced points adapted to prevent the sections from telescoping. The resilient sections 15 and 16 are curved transversely to form a substantially annular split body 17 in cross section and the edges of this body 17 are provided with circumferentially extending flanges 18. The springs E which are adapted to absorb shock transmitted directly to the tread are preferably formed of spring steel oil tempered, and are of the leaf type and include a substantially annular body 18, the outer edge of which is adapted to engage the inner surface of the body 17 of the sections 15 and 16 at the point where the sections 15 and 16 engage the tread 12 of the tire casing B. The terminals of the spring body 18 are provided with outwardly extending arcuate extensions 19 which terminate in attaching feet 20, which may be riveted at 21 or otherwise secured to the inner surface of the sections 15 and 16 adjacent to the inner edges thereof.

The springs F which are particularly adaptable for absorbing shock transmitted to the side walls 13 of the tire casing B are also preferably formed of spring steel, oil tempered, and includes the curved spaced bodies 22 and 23 which are adapted to engage the walls of the body 17 of the sections 15 and 16. These bodies 22 and 23 are connected together by means of an arcuate connecting portion 24. The inner edges of the bodies 22 and 23 terminate in arcuate extensions 25 which are provided with attaching feet 26, which may be riveted as at 27 or otherwise secured to the body 17 of the sections 15 and 16 adjacent to the inner edges thereof.

The springs E and F are arranged in alternate relation to each other, as clearly shown in Fig. 1 of the drawings, and while the springs F are particularly designed to absorb shock coming at an angle to the tire, it is to be also understood that the same can effectively absorb shock transmitted directly to the tread of the tire casing B.

The springs G which are provided for connecting the inner edges of the bodies 15 and 16 together to prevent the spreading thereof beyond a predetermined point and for creating a tension between the flanges 18 formed on the inner edges of the bodies of the sections 15 and 16 are of the leaf spring type and include the transversely extending bodies 28, which are provided adjacent to their opposite ends with arcuate bight portions 29. The ends of the springs G are riveted or otherwise secured as at 29′ to the sections 15 and 16 adjacent to the flanges 18.

In applying the improved airless tube to the tire casing B, one section thereof is first inserted in the casing and the side walls of the body 17 thereof are compressed by springing the flanges 18 toward each other. This will permit the ready insertion of the section in the casing. After the first section has been placed in position, the second section is then placed in the casing by bringing the flanges 18 toward each other and by placing one end thereof into the tire casing first and then gradually swinging the other portion in. The tire casing B is then placed on the rim A in the ordinary manner and the flanges 11 thereof will effectively prevent the opening of the casing.

The improved tube will effectively absorb all shock transmitted to the tire casing and will entirely eliminate all trouble, heretofore experienced with the use of pneumatic air tubes.

Changes in details may be made without departing from the spirit or scope of this invention; but,

I claim:

1. The combination with a rim and tire casing, of a resilient core for the casing including a sectional annular resilient band formed of spring steel and curved transversely to form a substantially annular body in cross section, tread and side wall shock absorbing springs arranged in alternate relation in said band, and spring means connecting the inner edges of the band together.

2. A resilient inner tube for vehicle tires comprising an annular band formed from spring steel curved transversely to form a substantially circular body in cross section, resilient flexible means connecting the inner edges of the band together, shock absorbing leaf springs arranged to engage the inner surface of the tread portion of the band, and shock absorbing springs arranged intermediate the springs engaging the tread portion of the band for engaging the side walls of the band.

3. A resilient inner tube for vehicle tires comprising a pair of semi-circular bands formed of spring steel and curved transversely to form a body substantially of annular configuration in cross section, a plurality of transversely extending leaf springs arranged in the bands including substantially annular bodies, arcuately extending extensions formed on the ends of the bodies, and attaching feet formed on the extensions, means for securing the attaching feet to the bands adjacent to the free edges thereof, and leaf springs arranged intermediate the first springs and each including a pair of bodies arranged to engage the side walls of the bands, an arcuate bight portion connecting the bodies together, arcuate extensions formed on the bodies, attaching feet formed on the extensions, and means for securing the attaching feet to said bands adjacent to the free edges thereof.

4. An inner tube for vehicle tires comprising a pair of semi-circular bands formed of spring steel curved transversely to form a substantially annular body in cross section, flexible leaf springs connecting the edges of the bands together, and alternately arranged leaf springs engaging the outer wall of the bands and the side walls of the bands.

5. An inner tube for vehicle tires comprising a pair of semi-circular sections formed of spring steel curved transversely to form a substantially annular body in cross section, the free edges of the body having laterally extending flanges formed thereon, a plurality of shock absorbing springs arranged within the sections, flexible springs connecting the free edges of the sections together, and stop lugs carried by the terminals of the sections to prevent telescoping thereof.

JOSEPH J. KRALY.